June 12, 1956     J. M. DANIEL ET AL     2,749,922
GUIDE FOR TRIMMING SIDEBURNS OR THE LIKE
Filed Jan. 25, 1954
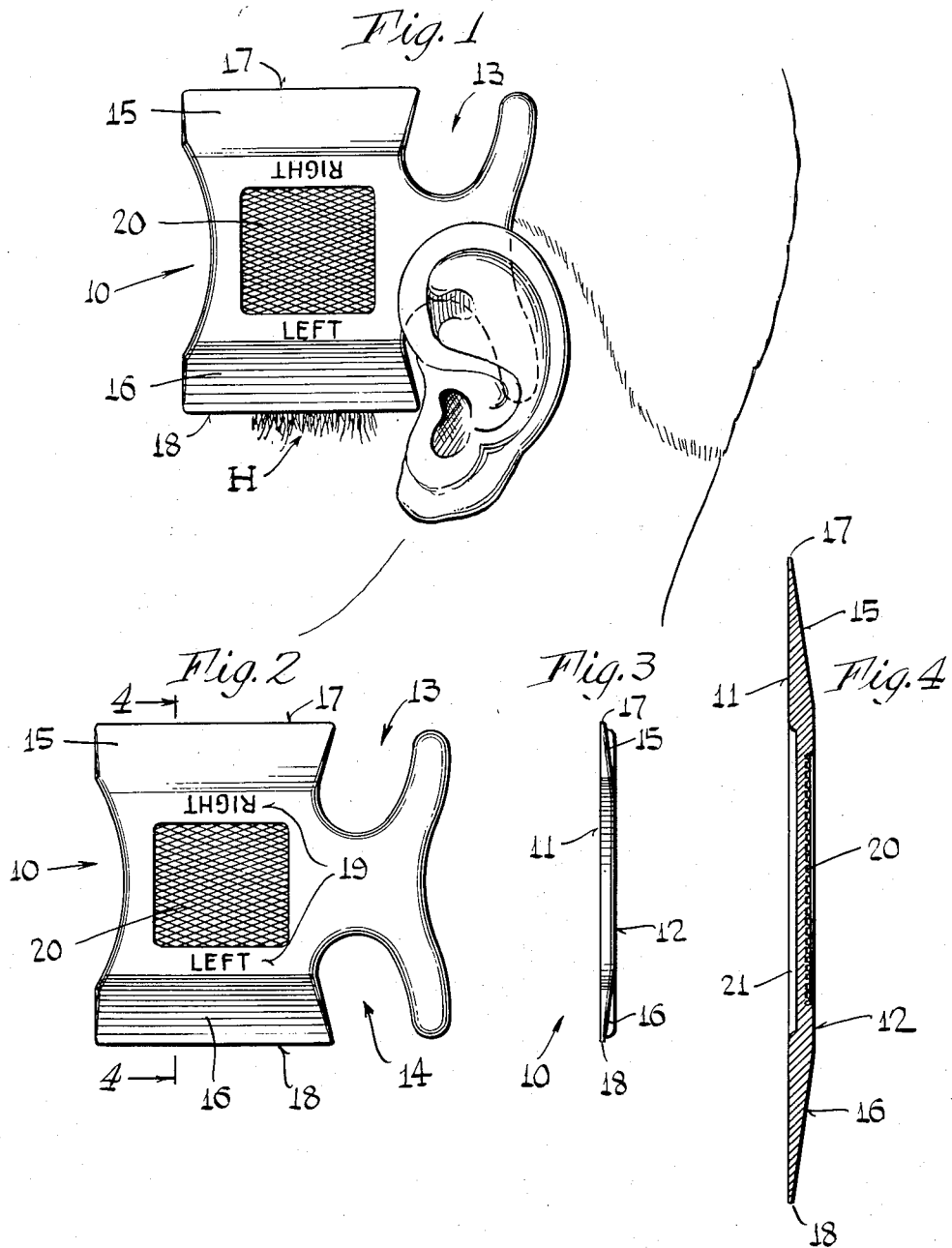
INVENTORS
John M. Daniel
Eric A. Hultgren
BY
Johnson and Kline
ATTORNEYS

United States Patent Office 2,749,922
Patented June 12, 1956

2,749,922
GUIDE FOR TRIMMING SIDEBURNS OR THE LIKE

John M. Daniel, Bridgeport, and Eric A. Hultgren, Fairfield, Conn.

Application January 25, 1954, Serial No. 405,852

4 Claims. (Cl. 132—45)

This invention relates to a device for use in trimming sideburns or the like.

Heretofore, efforts have been made to provide devices to aid in trimming sideburns which include head-encircling bands whereby they are secured in position on the head or provided with ear loops which extend around the ear to hold the device in place on the ear. These have been unsatisfactory and cumbersome in that they require fitting where the ear-engaging device is used and require extra parts where the head band is used.

The present invention overcomes these difficulties by providing a unitary plate which can be readily positioned on either side of the head as required and effectively held in place by the fingers, and can be mounted without adjustment of the plate. This is accomplished by providing a substantially flat plate with an inner head-engaging portion and an outer face. The opposed transversely extending edges of the plate are provided with tapered portions which taper from the outer face to the head-engaging portion, thus providing a thin edge on each side adapted to overlie the sideburn and guide the cutting instrument.

In order to enable sideburns to be trimmed to the desired length, the plate is provided with an ear-receiving notch on each side edge of the plate which extends around the ear and permits the device to be adjusted to proper position over the sideburn without interference by the ear.

In accordance with the present invention, the plate is provided on its outer surface with means whereby it can be easily held in position. Preferably this means is formed as a roughened portion on the outer surface between the two edges providing a finger-engaging surface for holding the device in place without slipping.

If desired, the head-engaging surface can be provided with a recess into which the fleshy part of the head extends when the device is pressed against the side of the head to effectively resist any slipping of the device.

A feature of the device resides in the fact that the single plate can be used to trim both right and left sideburns with equal ease and efficiency.

Another feature of the invention resides in providing all of the taper on the outer side so that the edges will be closely positioned over the sideburns to insure accurate cutting thereof by the cutting instrument.

The device can be made of any suitable material and can be molded or otherwise formed so as to provide an inexpensive yet efficient trimming guide.

Other features and advantages of the invention will be apparent from the specification and claims, when considered in connection with the drawings in which, Figure 1 shows a view of the device in position on the side of the head.

Fig. 2 shows a plan view of the device.

Fig. 3 is an end view of the device looking from the left.

Fig. 4 is an enlarged sectional view taken along line 4—4 of Fig. 2.

As shown in the drawings, the device of the present invention comprises a plate 10 having a substantially flat inner head-engaging surface 11 and an outer surface 12.

The opposite edges of the plate as shown in Fig. 2, are provided with ear-receiving notches 13, 14 adjacent one end thereof with the remaining edges formed with tapered portions 15, 16 in predetermined relation thereto.

As is shown in Figs. 3 and 4, the tapered portions 15, 16 taper toward the edges and extend from the outer surface substantially to the head-engaging surface at each side of the plate so that thin guiding edges 17, 18 are formed thereby and are located closely adjacent the hair H of the sideburns to guide the cutting device such as a razor, scissor or an electric shaver in producing a straight, even cut.

With the elements thus arranged, the device can be used to trim either the right or left sideburn with equal facility and efficiency. If desired, suitable indicia 19 may be provided to aid the user in selecting the proper position for use.

By employing an open notch in each edge, the user is enabled to position the guiding edge at any height on the sideburns he desires within the scope of the notch without modifying or otherwise altering the plate.

In order that the device may be securely held in position, suitable means is formed thereon. In the preferred form of the invention, the outer surface is provided with a roughened or knurled portion 20 producing a slip-resistant surface which is adapted to be engaged by the fingers to press the plate against either side of the head and securely hold it in place without danger of the fingers slipping during the cutting operation. If desired, the head-engaging portion of the plate can be provided with a recess 21 into which the fleshy part of the head extends when the plate is pressed against the side of the head to resist any tendency toward slipping.

The plate of the present invention can be made of any suitable material and formed in any suitable manner. In the preferred form of the invention, it is molded of plastic material.

From the foregoing, it will be seen that we have provided a simple inexpensive device which is capable of functioning efficiently to provide straight-cut edges for both right and left sideburns.

Variations and modifications may be made within the scope of the claims and portions of the improvements may be used without others.

We claim:

1. A device for use in trimming both right and left sideburns and the like, comprising a plate having an outer surface and an inner head-engaging surface and having on opposite side edges of the plate ear-receiving notches and tapered portions in predetermined relation thereto, said portions tapering to the inner surface at the edge to provide guiding edges for guiding a cutting device, and a roughened portion on the outer surface and located between said tapered portions to provide a finger-engaging portion for holding the device in position with either notch extending around the ear and the guiding edge overlying the sideburn.

2. A device for use in trimming both right and left sideburns and the like, comprising a plate having an outer surface and an inner head-engaging surface and having on opposite side edges of the plate ear-receiving notches and tapered portions in predetermined relation thereto, said portions tapering to the inner surface at the edge to provide guiding edges for guiding a cutting device, and a roughened portion on the outer surface and located between said tapered portions to provide a finger-engaging portion for holding the device in position with either notch extending around the ear and the guiding edge overlying the sideburn, said outer surface having indicia thereon to indicate the proper position of the plate for cutting either right or left sideburns.

3. A device for use in trimming sideburns and the like, comprising a plate of molded plastic, said plate having a substantially flat inner head-engaging surface and an outer surface and having on opposite edges of the plate ear-receiving notches and tapered portions in predetermined relation thereto, said portions tapering toward the flat surface at the edges of the plate to provide guiding edges thereon for guiding a cutting device, and a knurled portion on the outer surface of the plate between said tapered portions to provide a finger-engaging portion by which the device is pressed against the head when in position with either notch extending around an ear and the guiding edge overlying the sideburn.

4. A device for use in trimming both right and left sideburns and the like, comprising a plate of molded plastic, said plate having a substantially flat inner head-engaging surface provided with a recess therein and an outer surface and having on opposite edges of the plate ear-receiving notches and tapered portions in predetermined relation thereto, said portions tapering toward the head-engaging surface at the edges of the plate to provide thin guiding edges thereon to be engaged by and guide a cutting device when positioned over the sideburn, and a knurled portion on the outer surface of the plate between said tapered portions to provide a finger-engaging portion by which the device is pressed against either side of the head when in position with either notch extending around an ear and the guiding edge overlying the sideburn, the pressure of the plate against the head causing the skin to press into the recess and resist slipping of the device.

References Cited in the file of this patent

UNITED STATES PATENTS

| | | |
|---|---|---|
| 1,504,436 | Daughley | Aug. 12, 1924 |
| 1,538,614 | Bridges | May 19, 1925 |
| 1,567,011 | Parziale | Dec. 22, 1925 |
| 2,134,370 | Moore | Oct. 25, 1938 |
| 2,197,668 | Starr | Apr. 16, 1940 |
| 2,510,554 | Christie | June 6, 1950 |
| 2,546,161 | Lofgren | Mar. 27, 1951 |
| 2,550,972 | Cohen | May 1, 1951 |
| 2,637,909 | Thacker | May 12, 1953 |